(12) United States Patent
Kela et al.

(10) Patent No.: US 10,778,305 B2
(45) Date of Patent: Sep. 15, 2020

(54) METHOD AND APPARATUS FOR POSITION INFORMATION BASED DOWNLINK RECEIVE FILTER

(71) Applicant: Huawei Technologies Co., Ltd., Shenzhen (CN)

(72) Inventors: Petteri Kela, Helsinki (FI); Mario Costa, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 43 days.

(21) Appl. No.: 16/130,470

(22) Filed: Sep. 13, 2018

(65) Prior Publication Data

US 2019/0013853 A1    Jan. 10, 2019

Related U.S. Application Data

(63) Continuation of application No. PCT/EP2016/056440, filed on Mar. 23, 2016.

(51) Int. Cl.
*H04W 72/04* (2009.01)
*H04B 7/06* (2006.01)
(Continued)

(52) U.S. Cl.
CPC .......... *H04B 7/0617* (2013.01); *G01S 5/0009* (2013.01); *G01S 5/02* (2013.01);
(Continued)

(58) Field of Classification Search
CPC .... H04B 7/0617; H04B 7/0862; H04B 7/086; G01S 5/02; G01S 5/0009; G01S 5/0284;
(Continued)

(56) References Cited

U.S. PATENT DOCUMENTS

| 8,638,871 B2 * | 1/2014 | Krauss | H04B 7/0413 370/260 |
| 2005/0047515 A1 * | 3/2005 | Walton | H04B 7/0417 375/267 |

(Continued)

FOREIGN PATENT DOCUMENTS

| CN | 1481624 A | 3/2004 |
| CN | 101816132 A | 8/2010 |

(Continued)

OTHER PUBLICATIONS

Kela et al., "Supporting Mobility in 5G: A comparison between Massive MIMO and Continuous Ultra Dense Networks," IEEE International Conference on Communications (ICC), Institute of Electrical and Electronics Engineers, New York, New York (2016).
(Continued)

*Primary Examiner* — Hassan Kizou
*Assistant Examiner* — Mahbubul Bar Chowdhury
(74) *Attorney, Agent, or Firm* — Leydig, Voit & Mayer, Ltd.

(57) ABSTRACT

An access node comprises a processor and a transceiver. The transceiver is configured to receive at least one uplink reference signal corresponding to at least one user node. The processor is configured to determine, based on the at least one uplink reference signal, an estimated position of the at least one user node relative to the access node and at least one directional parameter corresponding to the estimated position of the at least one user node relative to the position of the access node. The transceiver is configured to send at least one downlink control information to the at least one user node, the at least one downlink control information including the directional parameters.

9 Claims, 10 Drawing Sheets

(51) Int. Cl.
*G01S 5/00* (2006.01)
*G01S 5/02* (2010.01)
*H04B 7/08* (2006.01)
*H04L 1/00* (2006.01)
*H04L 5/00* (2006.01)
*H04W 16/28* (2009.01)
*H04W 64/00* (2009.01)

(52) U.S. Cl.
CPC ........... *H04B 7/086* (2013.01); *H04B 7/0862* (2013.01); *H04L 1/0003* (2013.01); *H04L 5/0048* (2013.01); *H04W 16/28* (2013.01); *H04W 64/003* (2013.01); *H04W 72/042* (2013.01); *G01S 5/0215* (2013.01); *G01S 5/0284* (2013.01)

(58) Field of Classification Search
CPC . G01S 5/0215; H04W 72/042; H04W 64/003; H04W 16/28; H04L 5/0048; H04L 1/0003
See application file for complete search history.

(56) References Cited

U.S. PATENT DOCUMENTS

| | | | | |
|---|---|---|---|---|
| 2005/0135416 | A1* | 6/2005 | Ketchum | H04L 25/03343 370/469 |
| 2007/0064823 | A1* | 3/2007 | Hwang | H04B 7/0413 375/260 |
| 2010/0112996 | A1* | 5/2010 | Ho | H01Q 1/246 455/419 |
| 2011/0070908 | A1* | 3/2011 | Garcia Cabezas | H04W 16/28 455/507 |
| 2013/0034010 | A1* | 2/2013 | Gao | H04L 5/0023 370/252 |
| 2014/0369435 | A1 | 12/2014 | Kneckt et al. | |
| 2015/0105025 | A1* | 4/2015 | Zhang | H01Q 3/26 455/63.4 |
| 2015/0382318 | A1* | 12/2015 | Kim | G01S 5/0215 455/456.5 |
| 2016/0006122 | A1* | 1/2016 | Seol | H01Q 3/24 342/372 |
| 2016/0072562 | A1 | 3/2016 | Onggosanusi et al. | |
| 2017/0126379 | A1* | 5/2017 | Choi | H04L 1/00 |
| 2017/0127332 | A1* | 5/2017 | Axmon | H04B 7/18506 |

FOREIGN PATENT DOCUMENTS

| | | |
|---|---|---|
| CN | 103997780 A | 8/2014 |
| WO | 2015094155 A1 | 6/2015 |
| WO | 2015187130 A1 | 12/2015 |

OTHER PUBLICATIONS

Pedersen et al., "Frequency Domain Scheduling for OFDMA with Limited and Noisy Channel Feedback," IEEE 66th Vehicular Technology Conference, Institute of Electrical and Electronics Engineers, New York, New York (2007).
CN/201680082434.8, Office Action, dated Feb. 3, 2020.

* cited by examiner

METHOD AND APPARATUS FOR POSITION INFORMATION BASED DOWNLINK RECEIVE FILTER

CROSS-REFERENCE TO RELATED APPLICATIONS

This application is a continuation of International Patent Application No. PCT/EP2016/056440, filed on Mar. 23, 2016, the disclosure of which is hereby incorporated by reference in its entirety.

TECHNICAL FIELD

The aspects of the present disclosure relate generally to wireless communication systems and in particular to network aided receive beamforming.

BACKGROUND

In wireless communication systems, user devices equipped with multiple antennas are able to perform different diversity combining techniques to improve receiver performance. For example, receive beamforming traditionally uses downlink (DL) pilot measurements for obtaining DL channel information. This channel information can be used for calculating the antenna weights i.e. the receive filter. With receive filter usage, improvement can be achieved in user experienced signal-to-interference-plus-noise-ratio (SINR). Therefore, higher modulation and coding schemes (MCSs) can be used to increase throughputs.

In Long Term Evolution (LTE) systems, downlink reference signals, i.e. pilot symbols, can be measured for obtaining channel information. Downlink reference signals occupy time/frequency resource elements, which could also be used for data transmission. Hence, DL reference signals cause overhead and reduce the overall system capacity. Further, DL transmissions from other base stations can interfere with each other i.e. pilot pollution. Receive filters are typically sensitive to polluted reference signals due to the degraded channel estimation accuracy. On the other hand, if pollution is decreased by decreasing reference signal resource reuse, then overhead caused by reference signals will increase. If more physical resources are allocated for reference signaling, there are less physical resources for data transmission. It would be advantageous to use location measurements from uplink (UL) reference signals in receive beamforming and future standards.

Accordingly, it would be desirable to provide network aided beamforming that addresses at least some of the problems identified above.

SUMMARY

It is an object of the present invention to calculate a receive filter with antenna orientation and position information that is obtained from the network. This object is solved by the subject matter of the independent claims. Further advantageous modifications can be found in the dependent claims.

According to a first aspect of the present invention the above and further objects and advantages are obtained by an access node. The access node comprises a processor and a transceiver. The transceiver is configured to receive at least one uplink reference signal corresponding to at least one user node. The processor is configured to determine, based on the at least one uplink reference signal, an estimated position of the at least one user node relative to the access node and at least one directional parameter corresponding to the estimated position of the at least one user node relative to the position of the access node. The transceiver is configured to send at least one downlink control information to the at least one user node, the at least one downlink control information including the directional parameters. The aspects of the disclosed embodiments provide network aided receive beamforming by utilizing uplink reference signals for obtaining user node position and information on the orientation of the receive antenna array.

In a first possible implementation form of the access node according to the first aspect, the directional parameters comprise at least one of an azimuth and an elevation angle between the position of the access node and the estimated position of the at least one user node. The processor is configured to determine the azimuth and the elevation angles from the estimated position of the at least one user node relative to the access node. When the network knows the user orientation and position relative to itself, the network can provide azimuth and elevation angles pointing out the direction from where the user node should expect the strongest $LoS_{[JWT]}$ signal to be received.

In a second possible implementation form of the access node according to the first possible implementation form of the first aspect, the processor is configured to determine that the at least one user node and the access node are in a line of sight condition; determine a line of sight link adaptation offset value using an outer-loop link adaptation algorithm; and select a modulation and coding scheme to be included in the downlink control information based on the determined line of sight link adaptation offset value when the processor determines that the at least one user node and the access node are in the line of sight condition. When the user node and access node are in the line of sight condition, the line of sight path is the strongest component in the multi-path signal. It is beneficial to take into account the higher user experienced Signal to Interference Noise Ratio in the applied modulation and coding scheme.

In a third possible implementation form of the access node according to the first and second possible implementation forms the processor is configured to include position based receive filter parameters in the downlink control information when it is determined that the at least one user node and the access node are in the line of sight condition. The position based receive filter is most beneficial to users in the line of sight condition and the downlink control information indicates whether the user node should use position based beamforming or not.

In a fourth possible implementation form of the access node according to any one of the previous possible implementation forms, the processor is configured to determine orientation parameters of the at least one user node relative to the access node by acquiring calibration data of an antenna array of the user node from an uplink control channel, acquiring at least one uplink reference signal, acquiring the uplink channel from the at least one reference signal, and correlating the uplink control channel with the calibration data for different rotations of the antenna array. By the access node taking into account the orientation of the user node antenna array, the receive beamforming weights can be calculated.

In a fifth possible implementation form of the access node according to any one of the previous possible implementation forms the processor is configured to acquire the uplink channel of the antenna array of the user node by using orthogonal codes assigned to each antenna of the antenna array and the uplink reference signal. This enables the access node to acquire the uplink multiple-input-single-output (UL MISO) channel from the user node.

In a sixth possible implementation form of the access node according to any one of the previous possible implementation forms the processor is configured to include the determined orientation parameters in the downlink control information. The downlink control information can be utilized by the user node for calculating the receive filter.

In a seventh possible implementation form of the access node according to any one of the previous possible implementation forms the processor is configured to include receive beamforming parameters in the at least one downlink control information. The receive beamforming parameters in the downlink control information can be utilized by the user node for receive beamforming.

In an eighth possible implementation form of the access node according to any one of the previous possible implementation forms of the first aspect the processor is configured to determine an angle of departure of the antenna array of the user node relative to the access node and include the determined angle of departure in the at least one downlink control information. The downlink control information can be utilized by the user node for calculating the receive filter.

According to a second aspect of the present invention, the above and further objects and advantages are obtained by a user node. The user node comprises a processor and a transceiver. The transceiver is configured to receive downlink control information, the downlink control information including directional parameters corresponding to a position of an access node relative to an estimated position of the user node. The processor is configured to calculate a receive filter for receiving a downlink data transmission using the directional parameters. The aspects of the disclosed embodiments provide network aided receive beamforming by utilizing uplink reference signals for obtaining user node position and information on the orientation of the receive antenna array and then calculating a receive filter.

In a first implementation form of the user node of the second aspect the directional parameters include at least one of an azimuth and an elevation angle between the position of the access node and the estimated position of the user node. When the network knows the user orientation and position relative to itself, the network can provide azimuth and elevation angles pointing out the direction from where the user node should expect the strongest LoS signal to be received, which can be used in calculating the receive filter.

In a second implementation form of the user node according the first implementation form of the second aspect, the transceiver is configured to receive downlink data from the access node using the calculated receive filter. The receive filter calculated by the user node using the network derived directional information in the downlink control information improves receiver performance.

In a third implementation form of the user node according the first and second implementation forms of the second aspect the user node comprises a multi-antenna transceiver. The aspects of the disclosed embodiments provide network aided receive beamforming by utilizing uplink reference signals for obtaining user node position and information on the orientation of the receive antenna array for the multi-antenna transceiver and then calculating a receive filter for the multi-antenna transceiver.

According to a third aspect of the present invention, the above and further objects and advantages are obtained by a method that includes receiving one or more uplink reference signals from a user node, determining a position of the user node and directional parameters corresponding to a position of the user node relative to a position of an access node from the one or more uplink reference signals, generating downlink control information including the directional parameters, sending the downlink control information with the directional parameters to the user node and calculating a receive filter of the user node based on the directional parameters in the downlink control information. The aspects of the disclosed embodiments provide network aided receive beamforming by utilizing uplink reference signals for obtaining user node position and information on the orientation of the receive antenna array and then calculating a receive filter.

In a first possible implementation form of the method according to the third aspect downlink data is received in the user node using the calculated receive filter. The receive filter calculated by the user node using the network derived directional information in the downlink control information improves receiver performance.

In a second possible implementation form of the method according to the first possible implementation form of the third aspect, determining the directional parameters includes determining azimuth and elevation angles between the position of the access node and the determined position of the user node. When the network knows the user orientation and position relative to itself, the network can provide azimuth and elevation angles pointing out the direction from where the user node should expect the strongest LoS signal to be received.

In a third possible implementation form of the method according to the first and second possible implementation forms of the third aspect, a line of sight condition between the access node and the user node is determined and position based receive filter parameters are included in the downlink control information. When the user node and access node are in the line of sight condition, the line of sight path is the strongest component in the multi-path signal. It is beneficial to take into account the higher user experienced Signal to Interference Noise Ratio in the applied modulation and coding scheme.

In a fourth possible implementation form of the method according to the first through third possible implementation forms of the third aspect, the method includes determining orientation parameters of the user node relative to the access node by acquiring calibration data of an antenna array of the user node, the calibration data being included in the one or more uplink control channels; acquiring one or more uplink reference signals, and correlating an uplink channel with the calibration data for different rotations of the antenna array. By the access node taking into account the orientation of the user node antenna array, the receive beamforming weights can be calculated.

In a fifth possible implementation form of the method according to the first through fourth possible implementation forms of the third aspect, the method includes the providing the orientation parameters in the downlink control information. The downlink control information can be utilized by the user node for calculating the receive filter.

According to a fourth aspect of the present invention, the above and further objects and advantages are obtained by a computer program product comprising non-transitory computer program instructions that when executed by a processing apparatus causes the processing apparatus to perform the method according to the third aspect. The aspects of the disclosed embodiments provide network aided receive beamforming by utilizing uplink reference signals for obtaining user node position and information on the orientation of the receive antenna array and then calculating a receive filter.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed embodiments of the invention, for which reference should be made to the appended claims. Additional aspects and advantages embodiments of the invention will be set forth in the description that follows, and in part will be obvious from the description, or may be learned by practice of embodiments of the invention. Moreover, the aspects and advantages of embodiments of the invention may be realized and obtained by means of the instrumentalities and combinations particularly pointed out in the appended claims.

BRIEF DESCRIPTION OF THE DRAWINGS

In the following, embodiments of the invention will be explained in more detail with reference to the example embodiments shown in the drawings, in which.

DETAILED DESCRIPTION OF THE DISCLOSED EMBODIMENTS

Figure 1:
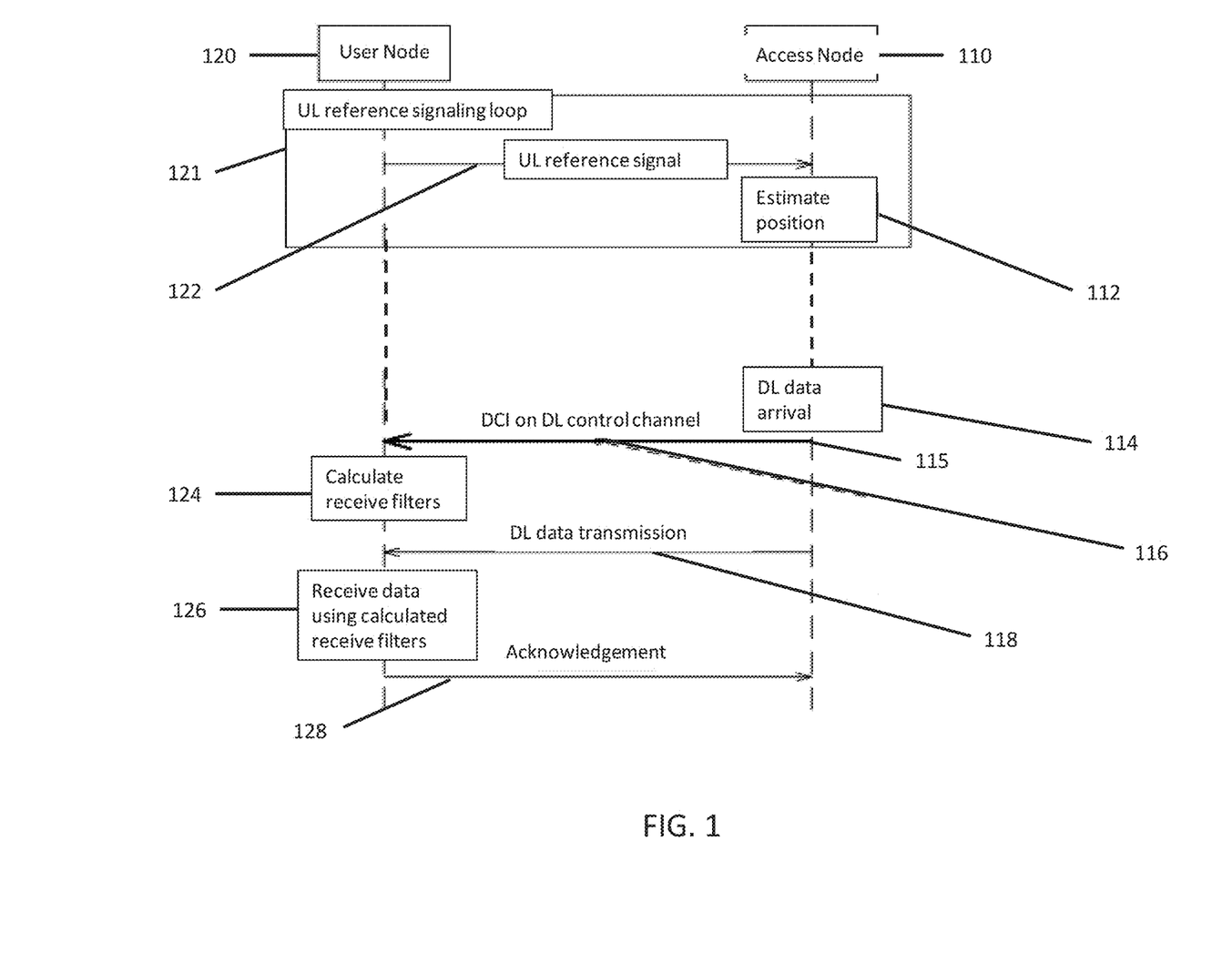
FIG. 1 is a state diagram illustrating aspects of the disclosed embodiments.

Referring to FIG. 1, the aspects of the disclosed embodiments are directed to provide network aided receive beamforming. In the example of FIG. 1, the access node (AN) 110, which can also be referred to as a network node, obtains position information, and in some cases orientation information, from one or more uplink reference signals 122. In one embodiment, the uplink reference signals 122 are sent or transmitted from one or more user nodes (UN) 120 which can also be referred to as the user equipment (UE).

The access node 110 is configured to determine an estimated position of the one or more user nodes 120 relative to the access node 110 from the at least one uplink reference signal 122. The access node 110 is also configured to determine at least one directional parameter corresponding to the estimated position of the at least one user node 120 relative to the position of the access node 110. At least one downlink control information 116 is sent from the access node to the at least one user node. The at least one downlink control information 116 includes at least one directional parameter.

The access node 110 can also detect whether a user node 120 is in a line-of-sight (LoS) or non-line-of-sight (NLoS) condition or state relative to the access node 110. When the user node 120 is in the LoS condition, the LoS path is the strongest component in the multi-path signal. It is also very hard to map the angle of departure to the angle of arrival if the user node 120 is not in the LoS condition.

When a user node 120 is scheduled, and if the user node 120 is in a LoS condition, the position information is used by the user node 120 to steer the receive beamforming filter of the user node 120 towards the access node 110. When the access node 110 knows the position information of the user node 120 relative to itself, the access node 110 can determine and provide azimuth and elevation angles pointing out the direction from where the user node 120 should expect the strongest LoS signal to be received. If the user node 120 is in a NLoS state, then it is up to the user node 120 to utilize its own measurements for possible diversity combining.

Figure 2:
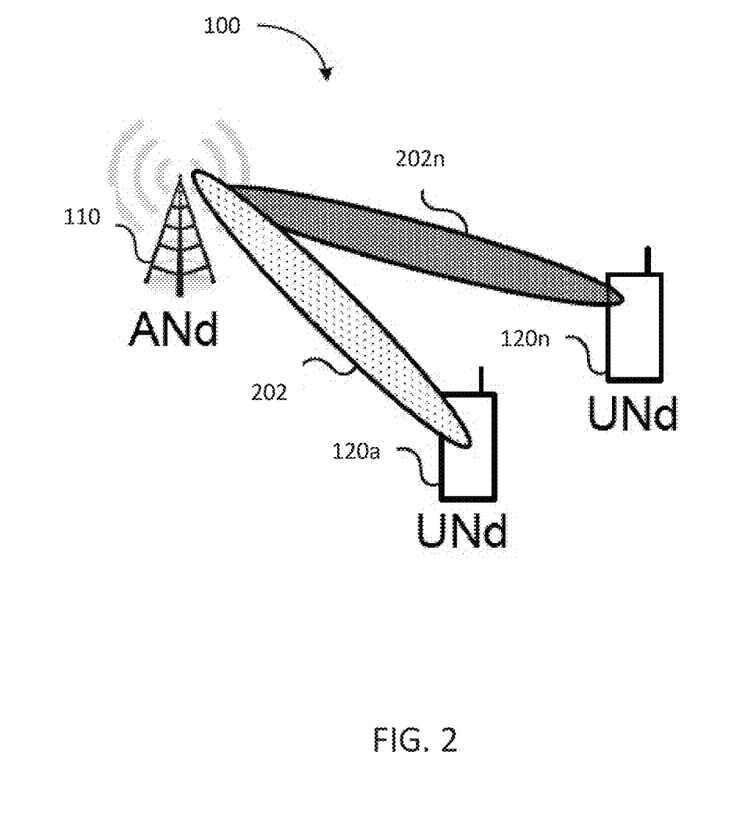
FIG. 2 illustrates a block diagram of a system incorporating aspects of the disclosed embodiments.

FIG. 2 illustrates an exemplary system 100 incorporating aspects of the disclosed embodiments. In this example, one or more user nodes 120a-120n are shown. The access node 110 can be communicatively coupled to one or more of the user nodes 120a to 120n via corresponding communication channels or radio links 202a to 202n.

In the example shown in FIG. 1, the access node 110 monitors the position of the user node 120 by measuring reference signals 122. The reference signals 122 can be sent from the user node 120. In one embodiment, the reference signals 122 are periodical or a-periodical. In the example of FIG. 1, the uplink reference signals 122 are generated in an uplink reference signaling loop 121. In alternate embodiments, the uplink reference signals 122 can be generated in any suitable manner and sent at or during any suitable time interval.

The access node 110 is configured to determine or estimate 112 a position of the user node 120 relative to the access node 110. Estimating 112 the position of the user node 120 can include determining one or more of the LoS/NLoS state and the angle of departure (AoD). In the example of FIG. 1, the access node 120 estimates 112 a position of the user node 120 from the reference signals 122.

In one embodiment, estimating 112 the position of the user node 120 will also include determining or estimating at least one directional parameter or information. The term "direction" or "directional" as used herein, generally refers to the angles used by the user node 120 to calculate 124 the receive filter. The directional parameters will generally identify the direction from where the user node 120 should expect the strongest LoS signal to be received. In one embodiment, the directional parameters can include an estimate of an azimuth and elevation angle of the user node 120 relative to a single access node 110, or multiple serving access nodes.

The access node 110 will generate downlink control information 116 that includes the directional parameters and send or transmit the downlink control information 116 with the directional parameters on a downlink control channel 115 to the user node 120. The directional parameters will be used by the user node 120 for receive beamforming, i.e. calculating 124 a receive filter that is used to receive downlink data 114.

When the access node 110 schedules the user node 120, the directional parameters, such as the azimuth and elevation angles, that will be used by the user node 120 for receive beamforming, can be set into or included as part of the downlink control information 116 that is sent from the access node 110 to the user node 120. One example of the downlink control information 116 for a single transport block is illustrated in Table 1, below.

| DCI FORMAT X | |
|---|---|
| FIELD | BIT LENGTH EXAMPLES |
| Carrier indicator | 0-3 |
| Resource allocation type | 1 |
| Physical Resource Block (PRB) assignment | 11 |
| Modulation and coding scheme | 5 |
| HARQ process number | 3 |
| New data indicator | 1 |
| Redundancy version | 2 |
| Transmission Power Control (TPC) command | 2 |
| Downlink Assignment Index | 0/2 |
| LoS/NLoS bit | 1 |
| Receive beamforming angles | 0/17 |

The number of bits used in the downlink control information 116 for delivering the receive beamforming angles will vary, depending upon the accuracy desired. In the example illustrated in Table 1, above, the number of bits can range of 0-17, for example.

In one embodiment, information pertaining to a LoS/NLOS condition of the user node 120 relative to the access node 110 can be included in the downlink control information 116. When the access node 110 knows the orientation and position of the user node 120 relative to itself, the access node 120 can provide azimuth and elevation angles pointing out the direction from where the user node 120 can expect the strongest LoS signal to be received. If the user node 120 is not in a LoS state (i.e. the user node 120 is in a NLoS state), the user node 120 can calculate 124 the receive filter in any suitable manner.

The downlink control information 116 will tell the user node 120 whether it should use position based beamforming or not. This requires for example:
  one additional bit added to the DCI 116;
  a separate DCI format used for scheduling LoS users; or
  some specified invalid values of azimuth/elevation angles, which can be interpreted to identify that the user node 120 is in a NLoS condition.

For example, if 17 bits are used in the downlink control information 116 to deliver the receive beamforming angles, then all azimuth and elevation angles with a 1 degree of accuracy can be delivered. Extra, invalid values, can be used to indicate a NLoS condition.

Using the downlink control information 116, the user node 120 calculates 124 the receive filter. Upon transmission 118 of the downlink data 114, the user node 120 can receive data using 126 the calculated receive filter. In one embodiment, an acknowledgement 128 is provide when the downlink data 114 is received.

Figure 3:
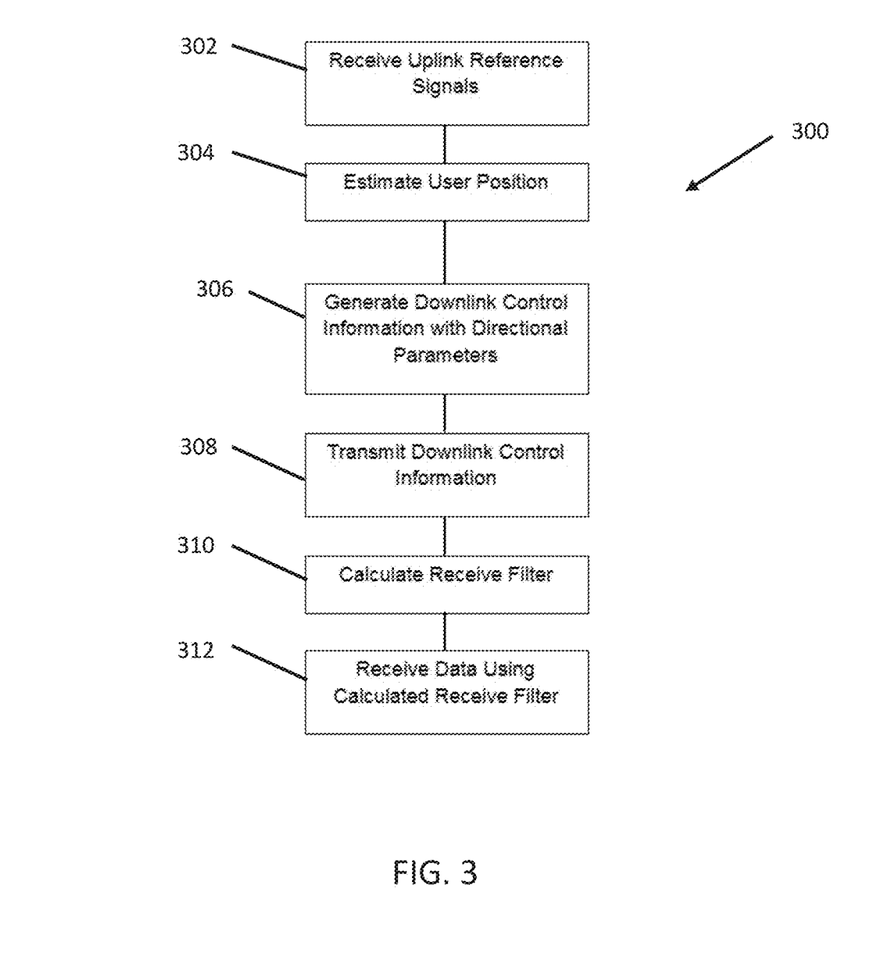
FIG. 3 illustrates one example of a process flow in an system incorporating aspects of the disclosed embodiments.

FIG. 3 illustrates an exemplary process incorporating aspects of the disclosed embodiments. In this example, uplink reference signals 122 are received 300. The uplink reference signals 122 are used to estimate 304 a position of a user node 120 relative to an access node 110. Downlink control information 116 is generated 306. The downlink control information 116 includes directional parameters corresponding to the estimated position of the user node 120 relative to the access node 110. The downlink control information 116 is sent 308 to the user node 120. The user node 120 calculates 310 a receive filter and uses the calculated receive filter to receive 312 downlink data 114. In this matter, a network aided position based receive filter is provided.

Figure 4:
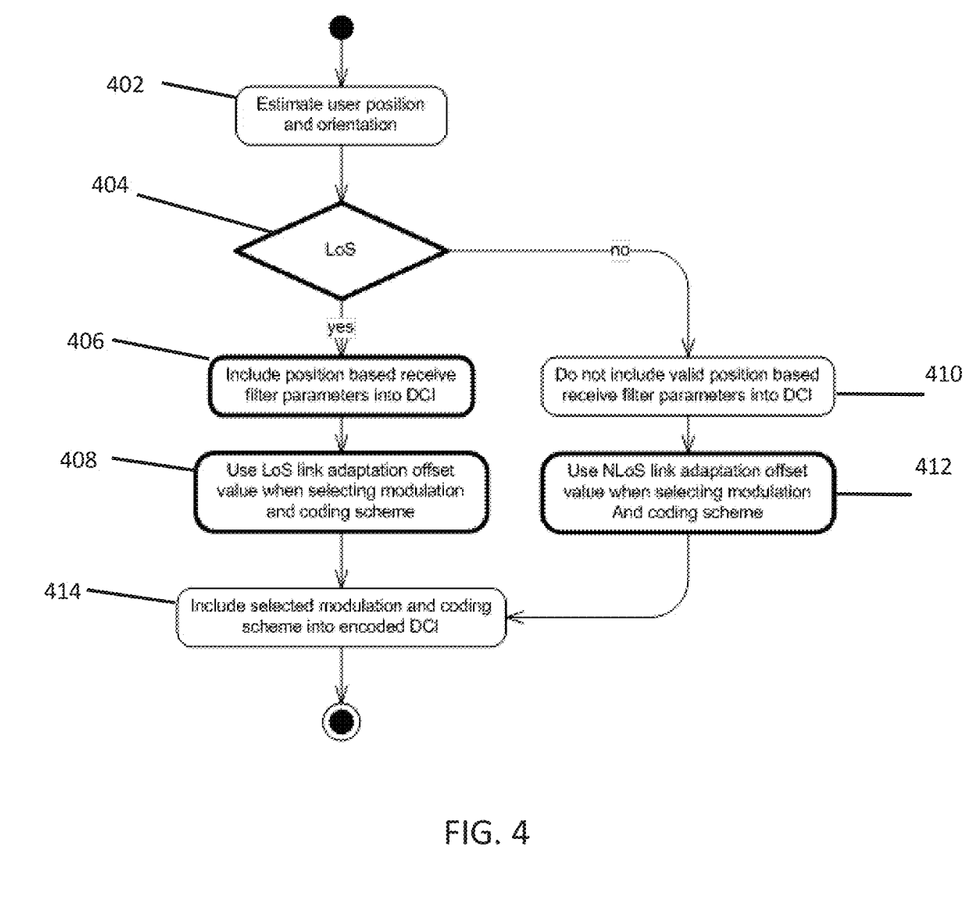
FIG. 4 illustrates one example of a process flow in an access node incorporating aspects of the disclosed embodiments.

FIG. 4 illustrates an exemplary process 400 at an access node 120 incorporating aspects of the disclosed embodiments. The process 400 illustrates the decisions at the access node 120 to be taken into account when composing the downlink control information 122 for a scheduled user node 120. Using the one or more uplink reference signals 122 of FIG. 1, the position of the user node 120 is estimated or determined 402. In one embodiment, as will be described in more detail below, estimating the position of the user node 120 can also include determining an orientation of the user node 120 relative to the access node 110.

It is determined 504 whether the user node 120 and the access node 110 are in a LoS condition. If the user node 120 and access node 110 are determined to be in a LoS condition, the position based receive filter parameters (receive beam forming angles) are included 406 in the downlink control information 116. The LoS condition can be determined based on the Rice factor of the received signal strength, in a manner as is generally understood.

In one embodiment, when the user node 120 and access node 110 are determined to be in the LoS condition, a LoS link adaptation offset value is used 408 to select the modulation and coding scheme. In the LoS condition, the signal-to-interference ratio (SINR) experienced by the user node 120 is higher than in a NLoS state, due to the significantly lower attenuation of signal, as will be generally understood. It is advantageous to take this into account in modulation and coding scheme selection, i.e. in the link adaptation phase.

For example, if a well-known outer-loop link adaptation (OLLA) algorithm is used in the link adaptation phase, then separate offsets should be generated for LoS and NLoS conditions. The purpose of OLLA is to adjust offset for SINR estimation based on HARQ feedback. The target of OLLA is to maintain a desired block error rate (BLER) target. If ACK/NACK 128 is received for a LoS transmission for which a position based receive filter was utilized, then a LoS OLLA offset could be tuned. If ACK/NACK 128 is received for a NLoS transmission, then other NLoS OLLA offsets could be tuned.

If it determined 404 that the user node 120 and the access node 11 are in a NLoS condition, the downlink control information 116 does not include 410 valid position based receive filter parameters. Rather, in one embodiment, invalid position based receive filter parameters are used. ANLoS link adaptation offset is used 412 when selecting the modulation and coding scheme, when the user node is in a NLoS state. For example, the user node 120 can utilize its own measurements for possible diversity combining. The selected modulation and coding scheme is included 414 into the downlink control information 116.

Figure 5:
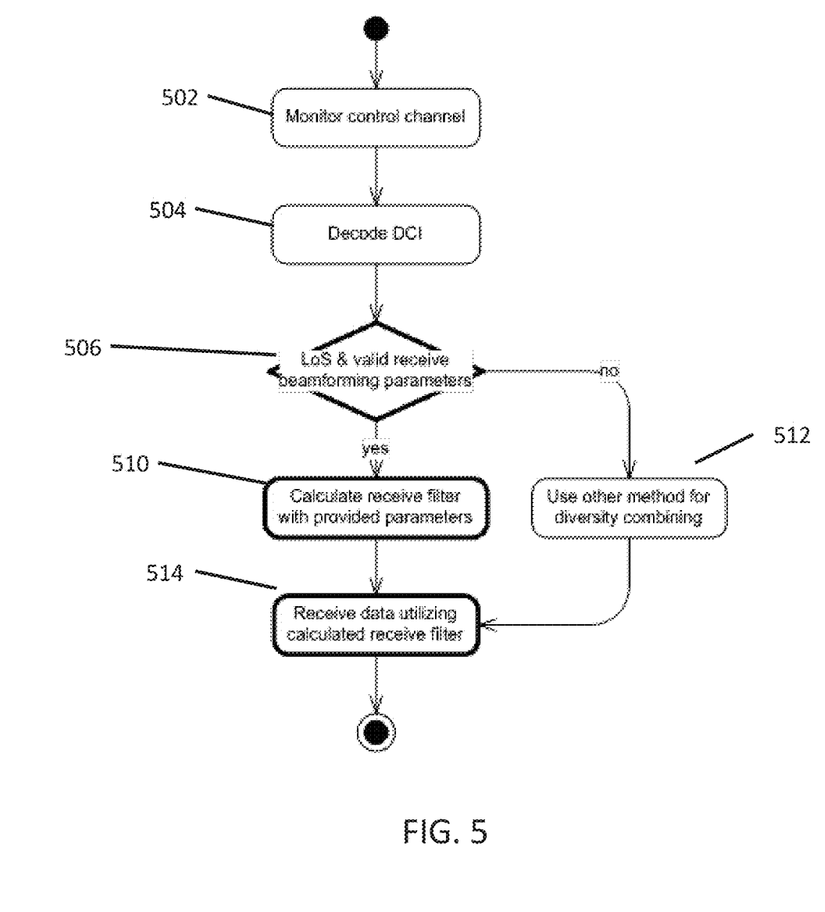
FIG. 5 illustrates one example of a process flow in a user node incorporating aspects of the disclosed embodiments.

FIG. 5 illustrates an exemplary process when receiving position based information for calculating a receive filter in a user node 120 incorporating aspects of the disclosed embodiments.

In this example, when the user node 120 is active, the user node 120 monitors 502 the downlink control channel 115.

The downlink control information 116 received by the user node 120 is decoded 504. The user node 120 determines 506 whether the received downlink control information 116 includes one or more of valid receive beamforming parameters and LoS condition information.

If it is determined 506 that the downlink control information 116 received by the user node 120 includes a downlink allocation with valid receive beamforming parameters, i.e. receive beamforming angles, and a LoS condition indication, the user node 120 is configured to calculate 510 a receive filter. The user node 120 can then receive 412 downlink data utilizing the calculated receive filter.

If it is determined 506 that the downlink control information 116 does not include a downlink allocation with valid receive beamforming parameter or a LoS condition indication, in one embodiment, the user node 120 is configured to use 512 any suitable method for diversity combining. The user node 120 is configured to receive 514 data using the calculated receive filter.

In one embodiment, an orientation of the user node 120, and in particular an orientation of the antenna array for the user node 120 is taken into account when calculating the receive filter, i.e. calculating the receive beamforming weights. The orientation, or orientation parameters, as are described herein, generally refer to parameters that define the position of the antenna array, such as the Euler angles, for example.

In this example, the orientation of the antenna array of the user node 120 relative to the access node 110 is determined using the one or more uplink reference signals. In Equation 1 below, let "G" denote the sampling matrix of the antenna array of the user node 120. The sampling matrix is a spherical harmonic transform of the calibration matrix of the antenna array of the user node 120, and it describes the coordinate system of the user node 120 used in receive beamforming. The user node 120 needs to send the sampling matrix to the access node 110. The number of rows of the sampling matrix equals the number of antennas at the user node 120, while the number of columns is typically in the order of 100-500.

Every time the access node 110 needs to estimate the orientation of the antenna array of the user node 120, the access node 110 needs to acquire the uplink multiple-input-single-output (UL MISO) channel from the user node 120, denoted by "h." In one embodiment, this can be done using orthogonal codes assigned to each of the antennas of the user node 120, and exploiting the uplink reference signal 122. There is no need to transmit wideband/multicarrier uplink pilots.

Once the access node 110 estimates the UL MISO channel "h" from the uplink reference signal 122, the access node 110 can estimate the orientation of the antenna array of the user node 120 by correlating "h" with multiple rotations of "G." The rotation aims at emulating a rotation of the antenna array of the user node 120. Equation 1, below, implements the afore-mentioned rotation.

$$P(\alpha,\beta,\gamma)=|y^H(\theta_{LoS},\vartheta_{LoS})*W^H(\alpha,\beta,\gamma)*G^H*h|^2 \quad \text{Equation 1:}$$

In the example of Equation 1, "y" is a vector of spherical harmonics, "$\theta_{LoS},\vartheta_{LoS}$" denotes the angles of the LoS path/ or user node 120 position relative to the access node 110 and "W" denotes the Wigner-D matrix. The angles $(\alpha,\beta,\gamma)$ denote the Euler angles according to a ZYZ rotation. The estimated rotation is chosen by the angles that maximize P. The idea of this method is to correlate the estimated channel from the user node 120 with different rotations of the antenna array of the user node 120.

Figure 6:
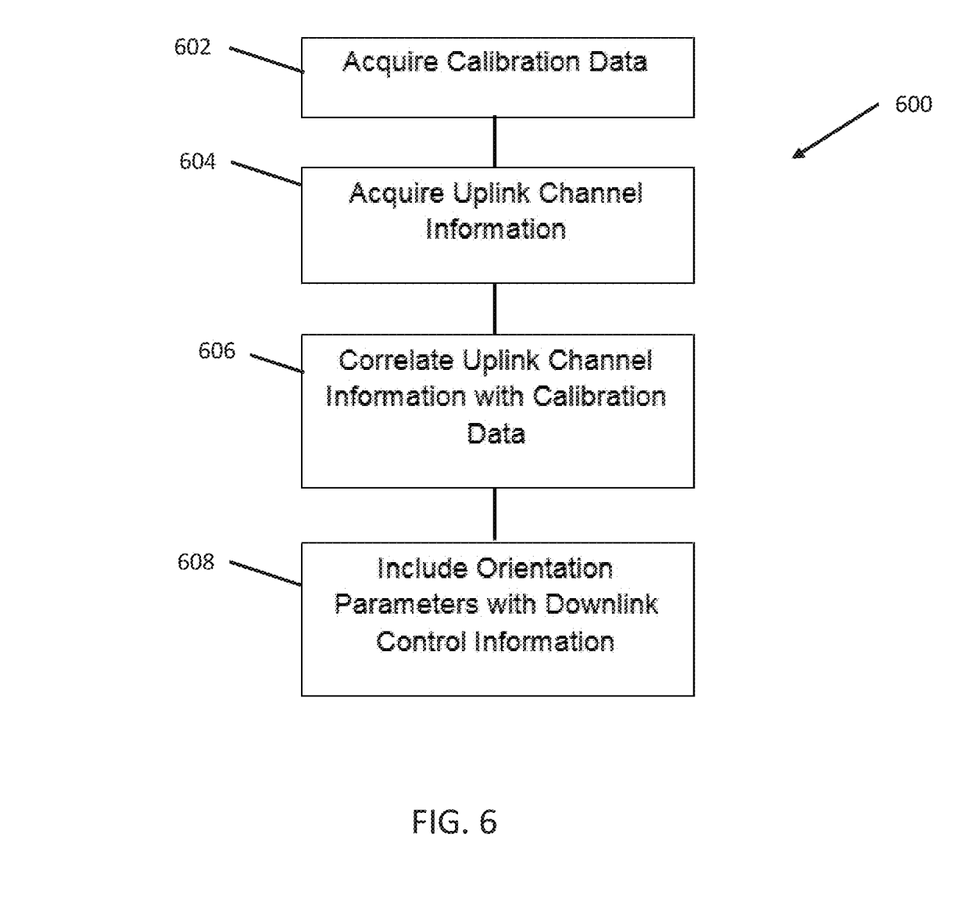
FIG. 6 illustrates an exemplary process for determining orientation parameters of a user node in a system incorporating aspects of the disclosed embodiments.

FIG. 6 illustrates an exemplary process 600 for determining the orientation parameters of the user node 120 in a system 100 incorporating aspects of the disclosed embodiments. In this example, the calibration data of the antenna array of the user node 120 is acquired 602. The uplink channel from the antenna array of the user node 120 is acquired 604. The acquired uplink channel of the antenna array is then calibrated 606 with the calibration data for different rotations G of the antenna array.

Figure 7:
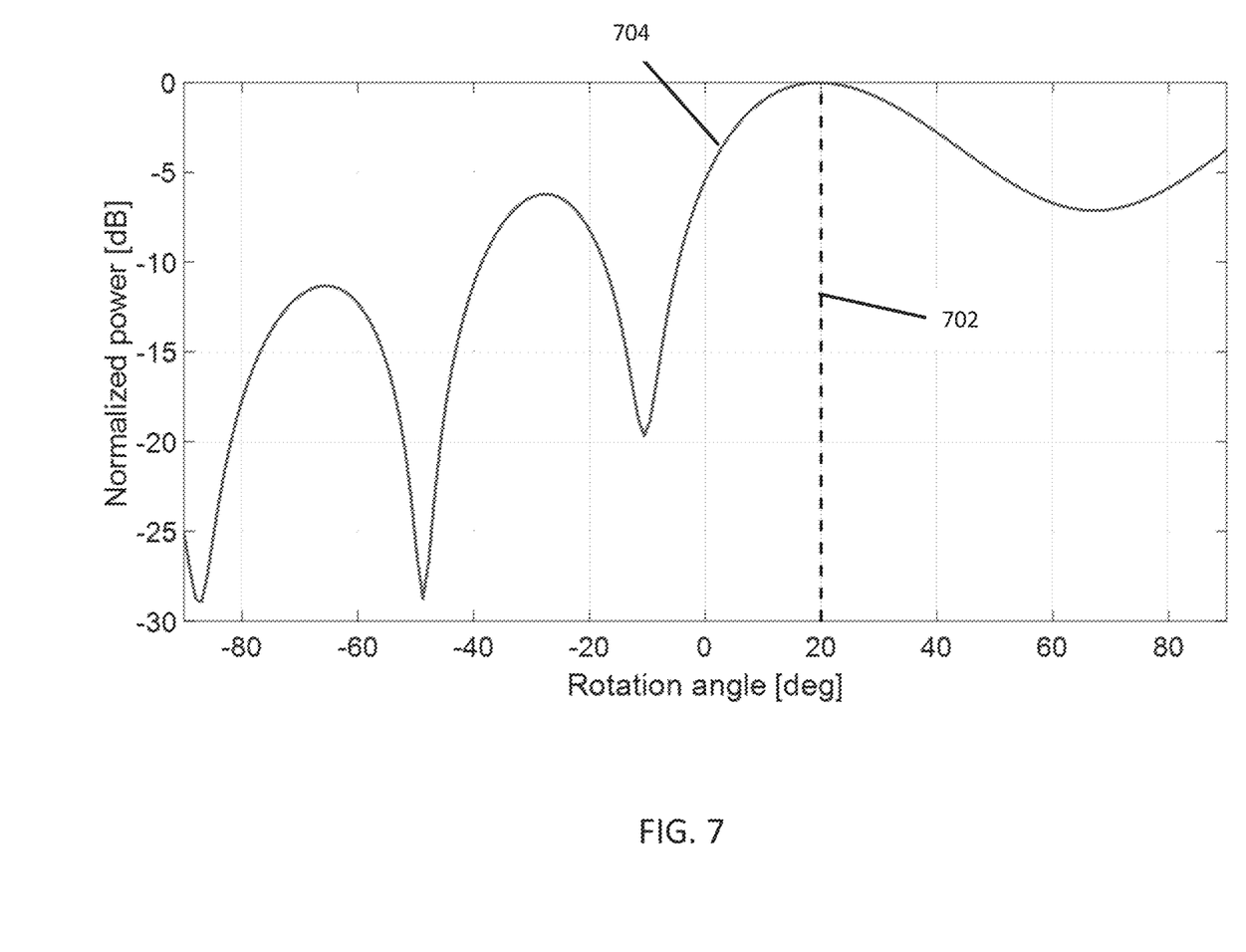
FIG. 7 is a graph illustrating an estimation of the orientation of the user node 120 using a realistic ray-tracing channel model.
Figure 8:
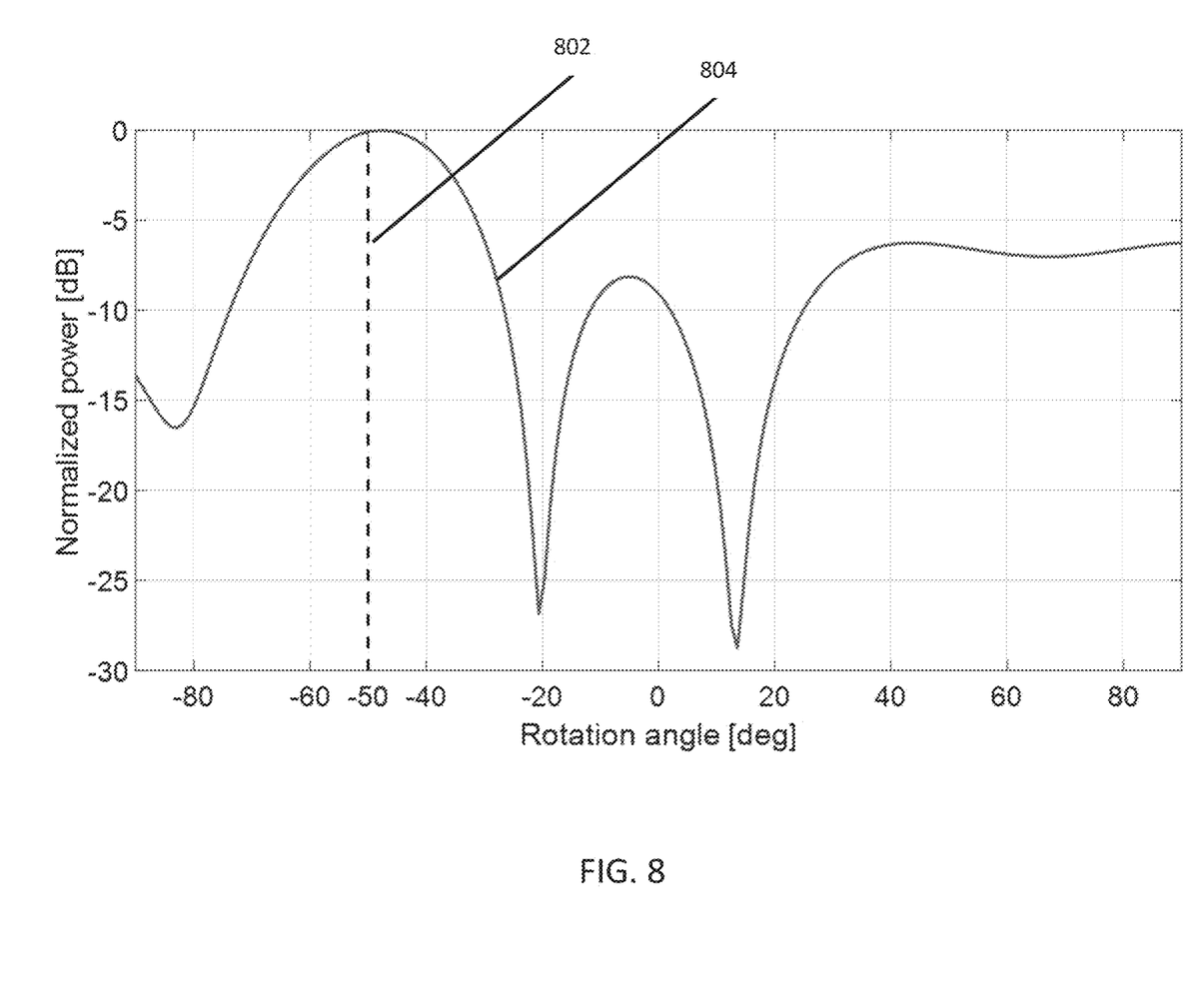
FIG. 8 is a graph illustrating an estimation of the orientation of the user node 120 using a realistic ray-tracing channel model.

FIGS. 7 and 8 are graphs illustrating two examples of the expression P using a realistic ray-tracing channel model. The results show that an error of about 1 degree in orientation estimation can be achieved by the network.

In FIG. 7, an estimation of the orientation of the user node 120 using a realistic ray-tracing channel model is illustrated. A 4-elements linear antenna array is assumed at the user node 120, and the antenna array is rotated by approximately 20 degrees in the XY-plane. In alternate embodiments, the number of elements in the linear array can include any suitable number, other than including 4. The vertical dashed line 702 illustrates the actual orientation while the maximum of the power-spectrum (curved line 704) illustrates the estimated orientation. The graph in FIG. 7 shows that accurate estimation of the orientation of the user node 120 by the access node 110 is possible.

FIG. 8 illustrates an estimation of the orientation of the user node 120 using a realistic ray-tracing channel model. In this example, a 4-elements linear array is assumed at the user node 120, and the array is rotated by approximately −50 degrees in the XY-plane. In alternate embodiments, the number of elements in the linear array can include any suitable number, other than including 4. The vertical dashed line 802 illustrates the actual orientation while the maximum of the power-spectrum (curved line 804) illustrates the estimated orientation. The error is about 1 degree. The results in FIG. 8 show that accurate estimation of the orientation of the user node 120 by the access node 110 is possible.

Figure 9:
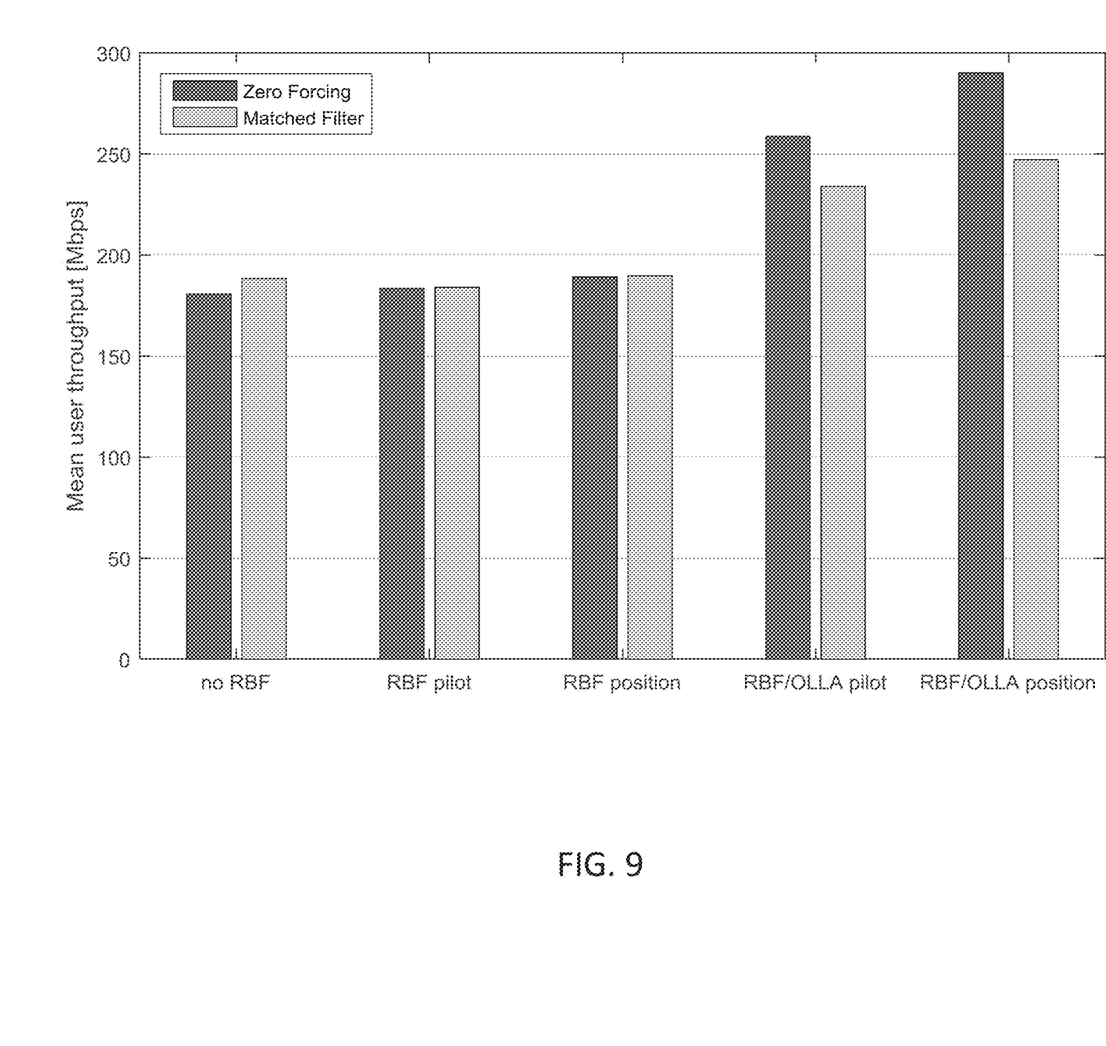
FIG. 9 is a graph illustrating the results of a simulation of a system incorporating aspects of the disclosed embodiments.

FIG. 9 illustrates the results of a simulation of a system incorporating aspects of the disclosed embodiments. In this example, the user nodes 120 were equipped with four antennas instead of one and user nodes 120 were able to use receive beamforming, i.e. calculate and utilize receive filters for downlink transmissions. The downlink pilot measurement based receive beamforming was compared to position based receive beamforming. In the case of downlink pilots, user nodes 120 measured precoded downlink pilots and calculated receive filters independently based on their own measurements. An OLLA algorithm was used in the access node 110 to learn gain from receive beamforming. This makes it possible to estimate correct modulation and coding scheme according to the SINR experienced by user node 120.

FIG. 9 also illustrates the gain obtained with position based receive beamforming and outer-loop link adaptation algorithm able to learn obtained SINR gain. In this study 2 degree error was assumed in elevation and azimuth angles. Further, position was estimated from uplink reference signals. Hence, also position information aging was assumed without prediction algorithms. For DCI sent to user, angles were rounded to nearest integer to simulate effect of delivering relative orientation information within limited length bitmap.

The graph of FIG. 9 shows the mean user throughput. "RBF" stands for receive beamforming. OLLA indicates that outer-loop link adaptation algorithm was used for more accurate SINR estimation in link adaptation phase.

Figure 10:
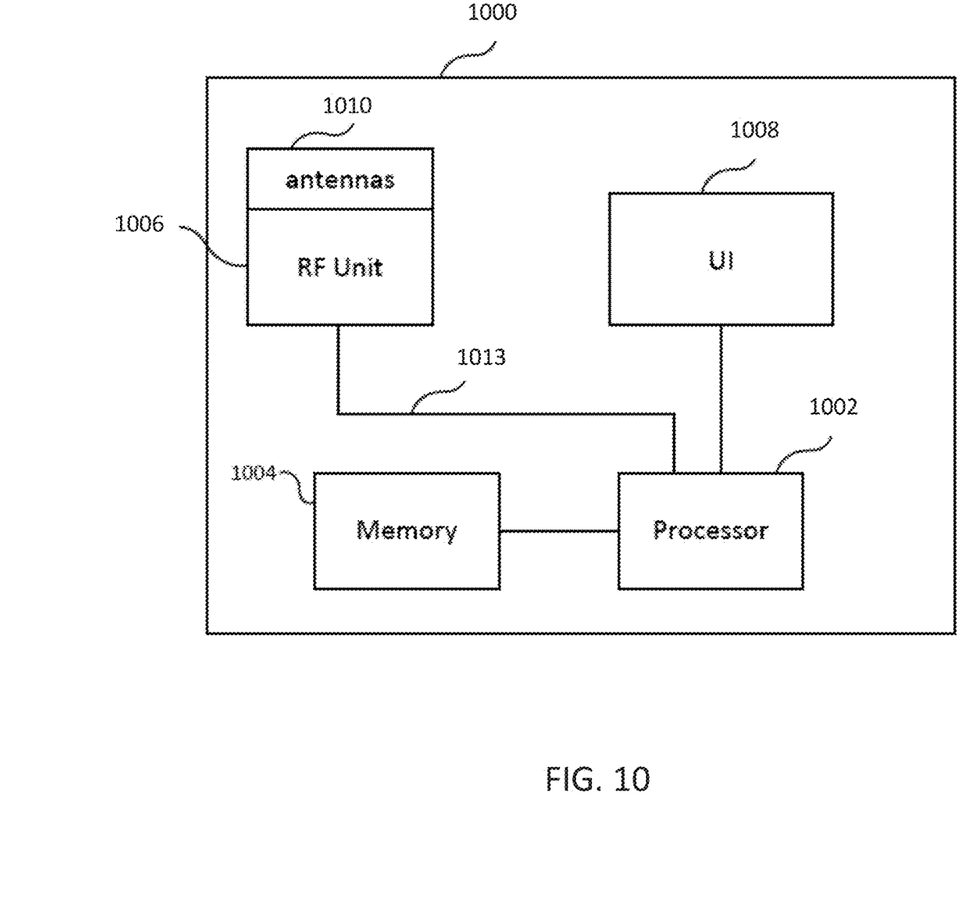
FIG. 10 is a block diagram of an exemplary apparatus that can be used to practice aspects of the disclosed embodiments.

FIG. 10 illustrates a block diagram of an apparatus 1000 that can be used to practice aspects of the present disclosure. The apparatus 1000 is appropriate for implementing embodiments of the network aided receive beamforming apparatus and methods described herein. Individual ones of the apparatus 1000 as described herein can be implemented in one or more of the access node 110 and user node 120.

The apparatus 1000 generally includes a processor 1002 coupled to a memory 1004, and a radio frequency (RF) unit 1006, also referred to herein as a transceiver. In one embodiment, the RF unit 1006 can include one or more antennas 1010, such as an antenna array(s).

The apparatus 1000 can also include a user interface (UI) 1008. The apparatus 1000 may be a node in a wireless communication system and used as a transmitter and/or receiver, such as in a base station. It may be desirable when using the apparatus 1000 as a base station to remove the UI 1008 and administer the apparatus 1000 remotely via a network or other type of computer interface (not shown).

The processor 1002 may be a single processing device or may comprise a plurality of processing devices including special purpose devices, such as for example digital signal processing (DSP) devices, microprocessors, or other specialized processing devices as well as one or more general purpose computer processors including parallel processors or multi-core processors. The processor 1002 is configured to perform embodiments of the processes described herein.

The processor 1002 is coupled to a memory 1004 which may be a combination of various types of volatile and/or non-volatile computer memory such as for example read only memory (ROM), random access memory (RAM), magnetic or optical disk, or other types of computer memory. The memory 1004 stores computer program instructions that may be accessed and executed by the processor 1002 to cause the processor 1002 to perform a variety of desirable computer implemented processes or methods as are described herein. The program instructions stored in memory 1004 may be organized as groups or sets of program instructions referred to by those skilled in the art with various terms such as programs, software components, software modules, units, etc., where each program may be of a recognized type such as an operating system, an application, a device driver, or other conventionally recognized type of software component. Also included in the memory 1004 are program data and data files which may be accessed, stored, and processed by the computer program instructions.

The RF Unit 1006 is coupled to the processor 1002 and configured to transmit and receive RF signals based on digital data 1013 exchanged with the processor 1002. The RF Unit 1006 is configured to transmit and receive radio signals that may conform to one or more of the wireless communication standards in use today, such as for example LTE, LTE-A, Wi-fi, or may be configured for future radio access techniques. The RF Unit 1006 may receive radio signals from one or more antennas, down-convert the received RF signal, perform appropriate filtering and other signal conditioning operations, then convert the resulting baseband signal to a digital signal by sampling with an analog to digital converter. The digitized baseband signal also referred to herein as a digital communication signal 1013 is then sent to the processor 1002. In transmitter applications, the RF Unit 1006 is configured to receive digital information in the form of digital data 1013 from the processor 1002 and transmit it to one or more receivers such as mobile devices or UE.

In an embodiment of an apparatus 1000 that includes a UI 1008, the UI 1008 may include one or more user interface elements such as a touch screen, keypad, buttons, voice command processor, as well as other elements adapted for exchanging information with a user.

The aspects of the disclosed embodiments aim at improving receiver performance, especially in ultra-dense network, which our research has shown can benefit from network aided receive beamforming. This is not possible in prior art due to lack of standard ways of performing such methods. In ultra-dense cellular networks, inter-cell interference is a significant problem due to short inter-site distances. Hence, it could be said that majority of users in crowded ultra-dense networks are subject to cell edge effects. The network aided receive beamforming advantageously uses measurements from uplink (UL) reference signals and position measurements in receive beamforming.

The network aided receive beamforming of the disclosed embodiments allows for improving spectral efficiency of DL transmissions and improvement of intra-cell interference cancellation. Zero Forcing precoding can be utilized better in ultra-dense networks. Downlink reference signals are not required for DL data reception, throughput improves for cell edge users and the network aided beamforming of the disclosed embodiments also works with other DL beamforming precoders, other than including Zero Forcing (e.g. Matched Filter) types.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An access node comprising:
    a processor; and
    a non-transitory computer readable medium, storing computer readable instructions that when executed by the processor, cause the following steps to be performed:
        receiving at least one first uplink reference signal corresponding to at least one user node;
        determining, based on the at least one first uplink reference signal, an estimated position of the at least one user node relative to the access node;
        determining at least one directional parameter corresponding to the estimated position of the at least one user node relative to the position of the access node; and
        sending at least one downlink control information to the at least one user node, the at least one downlink control information including the directional parameters;
        determining that the at least one user node and the access node are in a line of sight condition;
        determining a line of sight link adaptation offset value using an outer-loop link adaptation algorithm;

selecting a modulation and coding scheme to be included in the downlink control information based on the determined line of sight link adaptation offset value when at least one user node and the access node are in the line of sight condition; and determining orientation parameters of the at least one user node relative to the access node by:

acquiring calibration data of an antenna array of the user node from an uplink control channel;

acquiring at least one second uplink reference signal;

acquiring the uplink channel from the at least one second uplink reference signal; and correlating the uplink channel with the calibration data for different rotations of the antenna array, wherein an orientation of the antenna array is determined using a sampling matrix that is a spherical harmonic transform.

2. The access node of claim 1, wherein the directional parameters comprise at least one of an azimuth and an elevation angle between the position of the access node and the estimated position of the at least one user node, and the steps further comprise determining the azimuth and the elevation angles from the estimated position of the at least one user node relative to the access node.

3. The access node of claim 1, wherein position based receive filter parameters are included in the downlink control information when it is determined that the at least one user node and the access node are in the line of sight condition.

4. The access node of claim 1, wherein the steps further comprise acquiring the uplink channel of the antenna array of the user node by using orthogonal codes assigned to each antenna of the antenna array and the second uplink reference signal.

5. The access node of claim 1, wherein the determined orientation parameters are included in the downlink control information.

6. The access node of claim 1, wherein receive beamforming parameters are included in the at least one downlink control information.

7. The access node of claim 1, wherein the steps further comprise determining an angle of departure of the antenna array of the user node relative to the access node and include the determined angle of departure in the orientation parameters.

8. A method comprising:

receiving one or more first uplink reference signals from a user node;

determining a position of the user node and directional parameters corresponding to a position of the user node relative to a position of an access node from one or more first uplink reference signals;

generating downlink control information including the directional parameters;

sending the downlink control information with the directional parameters to the user node;

calculating a receive filter of the user node based on the directional parameters in the downlink control information;

acquiring calibration data of an antenna array of the user node, the calibration data being included in the one or more uplink control channels;

acquiring one or more second uplink reference signals;

acquiring the uplink channel from the at least one second uplink reference signal; and correlating an uplink channel with the calibration data for different rotations of the antenna array, wherein am orientation of the antenna array is determined using a sampling matrix that is a spherical harmonic transform.

9. The method of claim 8, comprising receiving downlink data in the user node using the calculated receive filter.

* * * * *